S. A. Cummings,
Knife Handle.
Nº 51,297.   Patented Dec. 5, 1865.
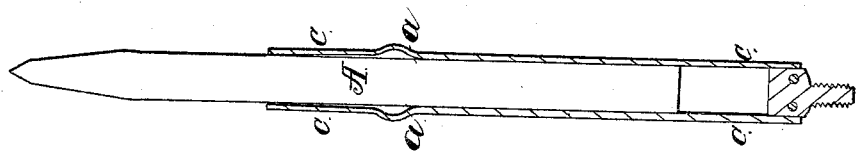
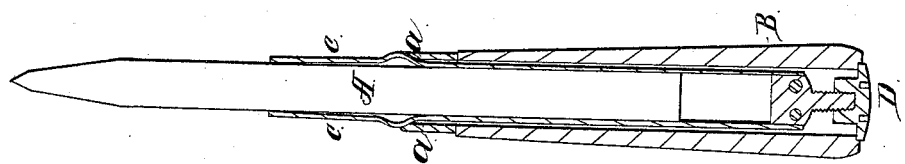
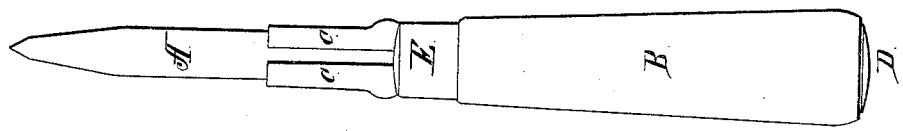
Witnesses:
Samuel N. Piper.
G. H. Washburn.
Inventor.
Samuel A. Cummings.
by his attorney
R. H. Eddy

UNITED STATES PATENT OFFICE.

SAMUEL A. CUMMINGS, OF MIDDLETON, MASSACHUSETTS.

KNIFE-BLADE HOLDER.

Specification forming part of Letters Patent No. 51,297, dated December 5, 1865.

*To all whom it may concern:*

Be it known that I, SAMUEL A. CUMMINGS, of Middleton, in the county of Essex and State of Massachusetts, have invented an Improved Knife-Blade Holder; and I do hereby declare the same to be fully described in the following specification and represented in the accompanying drawings, of which—

Figure 1 is a side elevation, and Fig. 2 a vertical section, of such handle and its blade. Fig. 3 is a section of the blade and its holding-jaws.

My invention is an improvement on the device described in the Patent No. 24,354, as granted on the 7th day of June, A. D, 1859, to Ira Merritt and L. S. Merritt, and which consisted in a knife-holder and an extensible blade so combined and arranged as to enable the blade, as it might become worn, to be farther projected from the handle.

In this invention the blade was grasped by the holding-jaws or clamps on its two sides only; but with my invention it is not only held or supported on its two opposite sides, but is grasped at its edges, whereby it is more securely held and supported, and is rendered not liable to slip sidewise, as it will when held by its sides only.

In the drawings, A denotes the blade, and B the handle. *c c* are the holding-jaws, and D the screw-nut for operating them. The cams of the holding-jaws, which, by being drawn against the ferrule E, serve to force the said jaws toward each other and against the edges of the knife-blade, are shown at *a a*. Each of the said jaws is formed to embrace the blade on its opposite sides, and to bear against its edge, the same being substantially as exhibited in the drawings.

The jaws, when so made and applied to the extensible blade, serve as guards to prevent either of the edges of the blade near the handle from cutting the finger or hand of an operative while holding and using the knife, and besides such jaws are advantageous in other respects.

What I claim as my invention is—

The improved shoe-knife-blade holder as made with its jaws *c c*, to grasp the opposite edges of the blade and to support the said blade on its opposite side, as specified.

S. A. CUMMINGS.

Witnesses:
R. H. EDDY,
G. H. WASHBURN.